US006463367B2

(12) United States Patent
Neff (10) Patent No.: US 6,463,367 B2
(45) Date of Patent: Oct. 8, 2002

(54) ELECTRIFIED MONORAIL COMMUNICATION SYSTEM

(75) Inventor: Robert F. Neff, Harper Woods, MI (US)

(73) Assignee: Rapistan Systems Advertising Corp., Grand Rapids, MI (US)

(*) Notice: Subject to any disclaimer, the term of this patent is extended or adjusted under 35 U.S.C. 154(b) by 0 days.

(21) Appl. No.: 09/775,264

(22) Filed: Feb. 1, 2001

(65) Prior Publication Data

US 2001/0034570 A1 Oct. 25, 2001

Related U.S. Application Data

(60) Provisional application No. 60/180,550, filed on Feb. 7, 2000.

(51) Int. Cl.⁷ .................................................. B61B 3/00
(52) U.S. Cl. ............................... 701/19; 701/20; 246/3
(58) Field of Search ............................. 701/19, 20, 23, 701/24; 246/3, 2 R, 5, 167 R, 182 R; 340/933, 988, 989

(56) References Cited

U.S. PATENT DOCUMENTS

| 4,919,057 A | | 4/1990 | Riley ......................... 104/295 |
| 4,984,521 A | | 1/1991 | Riley ......................... 104/290 |
| 5,149,024 A | | 9/1992 | Kawashima et al. .......... 246/66 |
| 5,592,883 A | * | 1/1997 | Andress, III ............. 104/88.03 |
| 5,632,589 A | | 5/1997 | Bray et al. .................. 414/339 |
| 5,676,514 A | | 10/1997 | Higman et al. ............. 414/339 |
| 6,109,568 A | * | 8/2000 | Gilbert et al. .................. 246/3 |
| 6,192,803 B1 | | 2/2001 | Nishino ........................ 104/93 |
| 6,281,606 B1 | * | 8/2001 | Westlake ..................... 307/125 |

FOREIGN PATENT DOCUMENTS

DE 197 40761 A1 3/1999 ........... B65G/35/08

OTHER PUBLICATIONS

International Search Report for application PCT/EP01/01264 which claims priority to the present application. Note this reference indicates that WO 9618757 corresponds to U.S. Patents 5,632,589 and 5,676,514.
English language abstract of DE 19740761.
Front page of publication WO 99/14976 which claims priority to DE 19740761 and which includes an English language abstract.
A twenty–nine page brochure dated 1998 that is entitled "Demag Control Components for Carrier Systems".
A packet of sheets entitled "LJU of America Inc., Electric Monorail Systems," which pre–date the present invention, and which include ten sections describing various aspects of the electric monorail system.

* cited by examiner

Primary Examiner—William A. Cuchlinski, Jr.
Assistant Examiner—Marthe Y. Marc-Coleman
(74) Attorney, Agent, or Firm—Van Dyke, Gardner, Linn & Burkhart, LLP (57) ABSTRACT

An improved communications for an electrified monorail includes an off-board programmable logic controller having at least one output electrically coupled to a buss bar of the electrified monorail. At least one other programmable logic controller is mounted on a vehicle that travels on the electrified monorail and includes at least one input in electrical contact with the buss bar. The off-board programmable logic controller is programmed to set its output at a series of high and low voltages corresponding to a message. The on-board programmable logic controller is programmed to detect the series of high and low voltages, store them at least temporarily in memory, and act accordingly upon the transmitted message.

33 Claims, 9 Drawing Sheets

ELECTRIFIED MONORAIL COMMUNICATION SYSTEM

CROSS-REFERENCE TO RELATED APPLICATIONS

This application claims priority to U.S. provisional patent application serial no. 60/180,550 filed Feb. 7, 2000, and entitled Electrified Monorail Control for Final Car Assembly Platform (Skillet) which is hereby incorporated herein in its entirety by reference.

BACKGROUND OF THE INVENTION

This invention relates generally to electrified monorails, and more particularly to communicating information from a device located off-board the electrified monorail to the vehicles that travel on the monorail. The term "electrified monorail" is intended to be used expansively, including systems that support carriers on more than one rail.

Electrified monorails are widely used in manufacturing environments today for transporting products throughout manufacturing plants and other types of buildings. The electrified monorails may be overhead electrified monorails, in which the rails are elevated and vehicles carry the product underneath the rails, or they may be skillet-type monorails, in which the rails are positioned on the floor and the skillets travel over the rails and support the product from underneath. In either situation, it is often desirable to be able to communicate information from an off-board source to one or more individual vehicles traveling on the electrified monorail. Such information may include speed, height, or position commands that dictate the speed of the vehicle and the height or position of the product being carried by the vehicle. Other types of information may also desirably be communicated to the vehicle, such as zone blocking information and the like.

In the past, the communication of such information to the vehicle has involved the use of proprietary communication systems. Such proprietary systems include an off-board communications module which is connected to at least one of the rails of the electrified monorail system, along with one or more communications modules located on the individual vehicles that are in electrical contact with the at least one communication rail. Because these proprietary communications systems use specialized electronics that are proprietary to a particular vendor, there is often a reluctance by system users to adopt such communications systems for fear the vendor may discontinue support of the product in the future. Such proprietary systems also tend to tie a system user to a particular vendor for service and upgrades, which is often undesirable for companies wishing to ensure multiple sources for their electrified monorail communications needs. Accordingly, a need exists for a simple electrified monorail communications system that does not tie a purchaser to a particular vendor or a specialized technology.

SUMMARY OF THE INVENTION

Accordingly, the present invention provides a communications system that generally uses standard, off-the-shelf components, that are widely known and used, thereby freeing potential customers from being dependent upon a particular vendor for products and maintenance. According to one aspect of the present invention, a communications system for an electrified monorail having at least one electrically conductive buss bar and a vehicle is provided. The communications system includes a first programmable logic controller having an output adapted to be electrically coupled to at least one electrically conductive buss bar. The output is capable of assuming more than one state. The first programmable logic controller is programmed to sequentially set its output at a series of different states corresponding to a message. A second programmable logic controller is also provided and includes an input adapted to be electrically coupled to the at least one electrically conductive buss bar. The second programmable logic controller is programmed to store in memory the series of different states output from the first programmable logic controller.

According to another aspect of the present invention, an electrified monorail system is provided that includes an electrified monorail with at least one buss bar, at least one carrier adapted to move on the electrified monorail, and a first and a second programmable logic controller. The first programmable logic controller includes an output electrically coupled to the buss bar. The output is capable of assuming more than one state such that a series of different states are output onto the buss bar. The series of different states correspond to a message. A second programmable logic controller is also provided and includes an input electrically coupled to the buss bar. The second programmable logic controller is located on the carrier and is programmed to store in memory the series of different states output from the first programmable logic controller.

According to yet another aspect of the present invention, a method is provided for transmitting information over a buss bar in an electrified monorail system. The method includes providing a first programmable logic controller with at least one output and a second programmable logic controller with at least one input. The output of the first programmable logic controller and the input of the second programmable logic controller are coupled to the buss bar. The first programmable logic controller is programmed to output a series of different states corresponding to the information onto the buss bar. The second programmable logic controller is programmed to detect the series of different states output onto the buss bar and at least temporarily store them in a memory in the second programmable logic controller.

The present invention provides a simple, reliable communications system for electrified monorails. Because the system is made up of off-the-shelf programmable logic controllers, customers of the communications system are not locked into any particular vendor for supplying the communications system. Further, because the communications system relies upon programmable logic controllers, which are widespread and well known, most customers can implement and maintain the communications system without specialized service personnel from the vendor. Additionally, the use of programmable logic controllers provides a more inexpensive communications solution than prior systems. These and other advantages of the present invention will be apparent to one skilled in the art in light of the following specification when read in conjunction with the accompanying drawings.

DETAILED DESCRIPTION OF THE PREFERRED EMBODIMENTS

Figure 1:
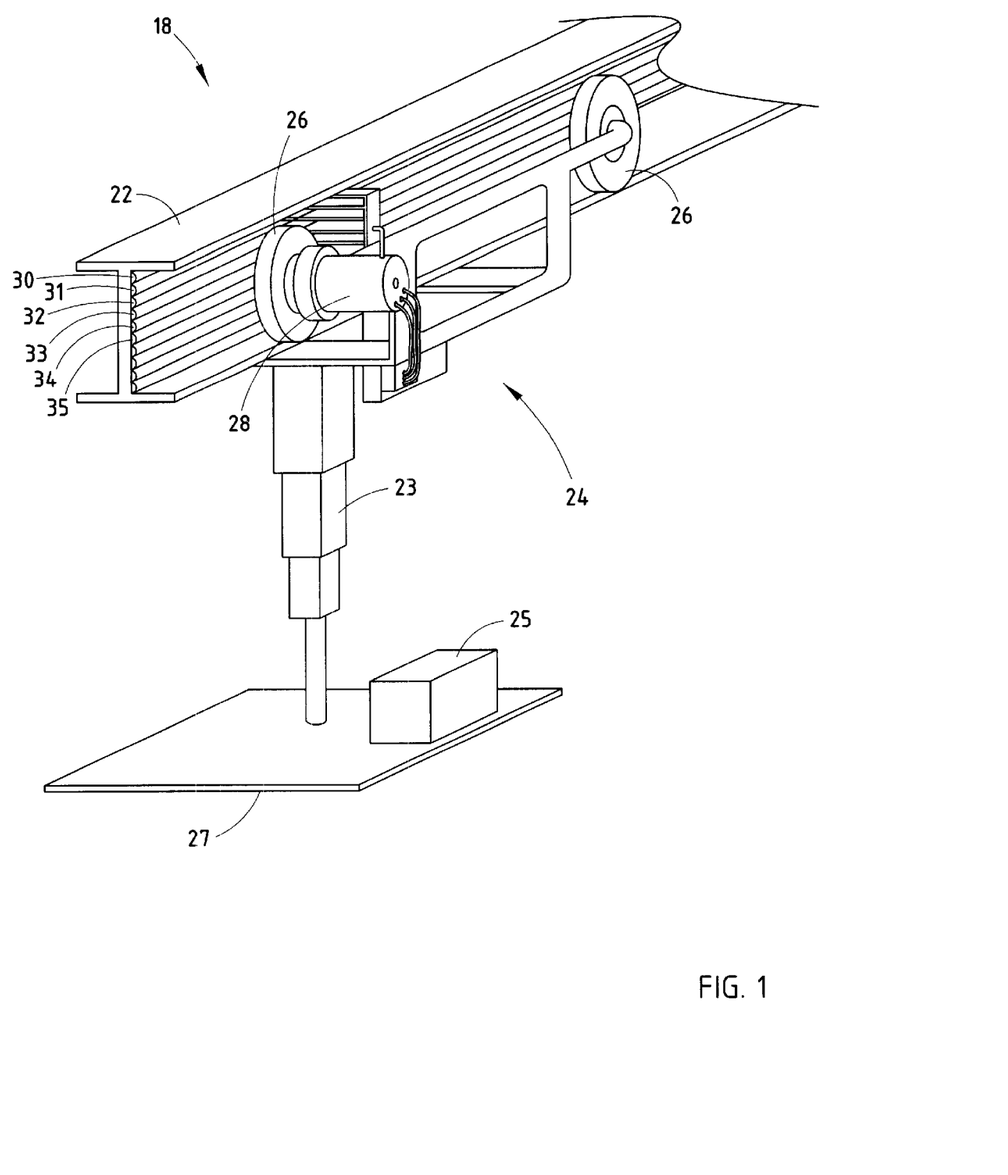
FIG. 1 is a perspective view of an example of an electrified monorail in which the communications system of the present invention may be implemented.

The present invention will now be described with reference to the accompanying drawings wherein like reference numerals correspond to like elements in the several drawings. An illustrative example of an electrified monorail system 18 to which the present invention may be applied is depicted in FIG. 1. Electrified monorail system 18 is illustrated as an overhead monorail system only as an only an illustrative example and the present invention may be used with any type of monorail system which includes at least one buss rail for communications. Other examples include monorail systems in which the rail is located on the floor and the vehicles travel on top of the rail. One such application for such a system is to support a skillet which is used for assembly of a vehicle in a vehicle assembly plant. As another illustrative example, the present invention finds application in the electrified monorail disclosed in commonly assigned, copending U.S. application Ser. No. 09/688,477, filed Oct. 16, 2000 by applicants Hans-Gerd Spoeler, et al., and entitled Monorail Telescopic Carrier, the disclosure of which is hereby incorporated herein by reference.

In the illustrated embodiment, electrified monorail system 18 is an overhead electrified monorail system that includes an overhead rail 22 and at least one vehicle 24 that moves along rail 22. Vehicle 24 is supported on rail 22 by a plurality of wheels 26 that are driven by a motor 28. Vehicle 24 may include a telescoping support 23 for adjusting the height of a platform 27 which carries product 25. Vehicle 24 carries products in a factory that need to be moved throughout the factory. Rail 22 includes a plurality of buss bars 30, 31, 32, 33, etc. Buss bars 30, 31, 32 . . . are electrical conductors that are electrically isolated from each other and serve a variety of functions. Typically, at least one of the buss bars provides power for motor 28 in order to move vehicle 24 along rail 22, and another buss bar provides a common electrical ground. According to the invention, at least one of the other buss bars, such as bus bar 35, is a communications buss bar. Communications buss bar 35 carries the electrical signals that are used for the communications between an off-board device and the individual vehicles 24 that move along rail 22.

Figure 2:
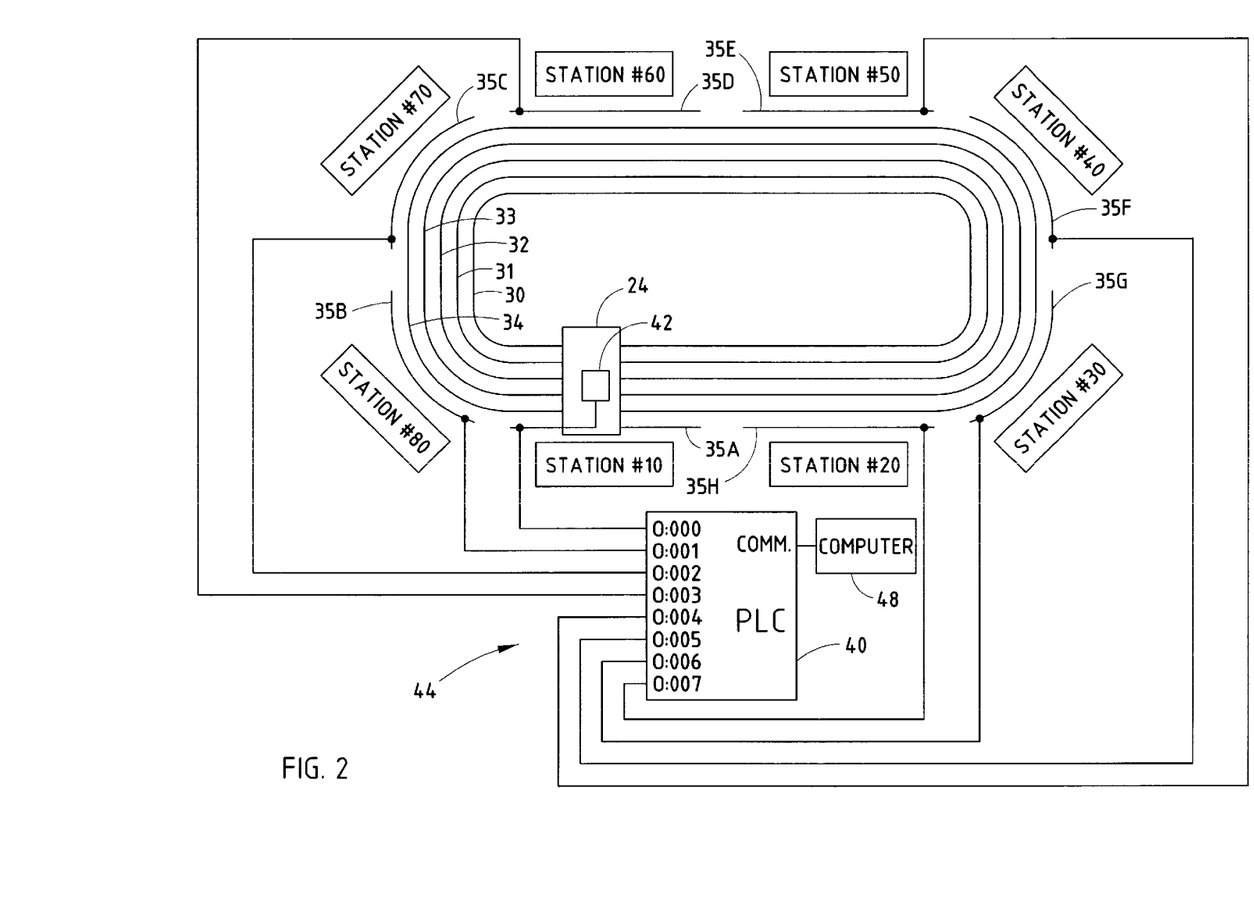
FIG. 2 is a block diagram of one embodiment of the communications system of the present invention.

A communications system 20 of the present invention, according to one embodiment, is depicted in block diagram in FIG. 2. Communications system 20 includes an off-board programmable logic controller (PLC) 40 and at least one on-board PLC 42. Off-board PLC 40 is located somewhere off of the vehicles travelling on the rail system while on-board PLC 42 is located on a vehicle 24 at any appropriate location (not shown in FIG. 1). There is one on-board PLC 42 for each of the vehicles 24 that are present in the system. In the illustrated embodiment, off-board PLC 40 is specifically an Allen-Bradley PLC-5/80, and on-board PLC 42 is specifically an Allen-Bradley MicroLogix™ 1500, both of which are sold by the Rockwell Automation Company of Milwaukee, Wisconsin. Other PLCs can, of course, be used within the scope of the invention for both the on-board and off-board PLCs. Off-board PLC includes at least one output 44 that is electrically coupled to the communications buss bar 35. Each on-board PLC 42 includes at least one input 46 that is electrically coupled to communications buss bar 35. The advantage of using PLCs is that they have generally standard input and output protocols which do not vary significantly from one manufacturer to another and are intended to be used with common off-the-shelf input devices and load devices. Therefore substitution of one manufacturer of PLCS 40, 42 for another could be accomplished without requiring the entire system to be replaced.

In broad overview, off-board PLC 40 communicates with on-board PLC 42 by sequentially activating and deactivating output 44 to generate a series of high and low voltages at output 44 that correspond to a message. When PLC 40 activates output 44, a 240 volt AC signal is produced at output 44. This signal corresponds to a logic high signal. When PLC 40 deactivates output 44, a substantially 0 volt signal is produced at output 44. This signal corresponds to a logic low signal. Because output 44 is electrically coupled to communications buss bar 35, the series of high and low signals output by PLC 40 are transmitted along the entire conductive length of communications buss bar 35. This series of high and low signals also travel to input 46 of on-board PLC 42 due to the electrical contact between this input and communications buss bar 35. On-board PLC 42 is programmed to detect this series of high and low voltages and take any appropriate action based upon the content of the transmitted message. While the content of the message can be anything, the message may include commands for controlling various settings on the vehicle 24. As an illustrative example, if the vehicles 24 are being used in an automobile manufacturing plant and are each carrying an automobile component, such as an automobile transmission, it may be desirable to command the vehicles 24 to adjust the height and rotation of the transmission as it is carried down the assembly line. Different work stations along the rail line may require that the transmission be positioned at different heights and angular orientations to facilitate the particular work being done at that work station. Also, the individual vehicles of the electrified monorail may be carrying different models of parts—for example, different types of transmissions for different car models—and it may be desirable to control the height and orientation of the part being carried based upon the particular model that is being carried. Making these types of adjustments can easily be carried out by sending the appropriate commands from off-board PLC 40 to on-board PLCs 42.

A simple example of a factory layout is depicted in FIG. 2. The factory layout includes an electrified monorail system 18 that is laid out in an oval shape. The electrified monorail system is designed to transport parts between stations 10, 20, 30, 40, 50, 60, 70, and 80. In this example, off-board PLC 40 includes eight outputs that are each electrically coupled to electrically isolated sections of communications buss bar 35. The isolated sections 35a, b, c, etc. of communications buss bar 35 allow off-board PLC 40 to communicate different messages to each isolated section 35a, b, c, etc. of communications buss bar 35. In the illustrated embodiment, each section 35a, b, etc. of communications buss bar 35 corresponds to a unique work station. Thus, if PLC 40 is to send a message to a vehicle located at work station #20, output O:007 of PLC 40, which is electrically coupled to communications buss bar segment 35h, is activated and deactivated according to the content of the desired message. Because communications buss bar segment 35h only spans a length generally corresponding to work station #20, only a vehicle at work station #20 will receive this message. If a message is to be sent to a vehicle at a different work station, a different output of PLC 40 that is electrically connected to the communications segment at that particular work station is activated. In this manner unique messages can be sent to the vehicles at each individual work station. This is especially useful when communications system 18 is used with vehicles that are not able to automatically determine their position in the factory. By sending unique messages to particular sections of the monorail system, the vehicle can be told to make the necessary adjustments for that particular work station even though the vehicle may not be cognizant of its location.

If provisions are made that allow each individual vehicle 24 to determine its location within the plant, such as by placing a unique arrangement of magnets at each work station that the vehicle 24 detects, it is not necessary to divide communications buss bar 35 into electrically isolated sections. In such a case, all of the transmitted messages can be broadcast over a common communications buss bar by simply including a position address in the message that identifies to which work station the information is intended. Only the vehicle or vehicles that are currently at that position address act upon the transmitted message. Alternatively, a unique vehicle address could be broadcast as part of the transmitted message and only the vehicle who bears that unique address would act upon the transmitted message. In either case, communications buss bar 35 need not be segmented and only one output 44 of off-board PLC 40 is necessary. For purposes of description herein, it will be assumed that communications system 20 is implemented in a factory like that of FIG. 2 wherein communications buss bar 35 is divided into electrically discrete segments. The invention can, of course, be used in different types of buss bar systems, such as those described above.

Off-board PLC 40 may be connected to a computer or computer system 48 that monitors the parts being transported by the electrified monorail vehicles 24 (FIG. 2). PLC 40 communicates with computer 48 through a standard communications port built into the PLC, rather than through one or more of the control inputs and outputs of PLC 40. The communications between off-board PLC 40 and computer 48 are carried out in a standard manner, such as via an RS-232, Ethernet, ControlNet, DeviceNet, or other communications connection. Computer 48 may be used to dynamically change the messages broadcast by off-board PLC 40 to on-board PLC 42. Computer 48 may be part of a factory-wide control system that monitors the progress of the parts being carried by electrified monorail 18. In such a case, the messages broadcast to PLCs 42 may depend not only upon their current position within the factory, but also may depend upon the particular part being transported by an individual vehicle 24. Both the position of the vehicles 24 and the parts being carried by each vehicle 24 may be monitored by computer 48.

Figure 3:
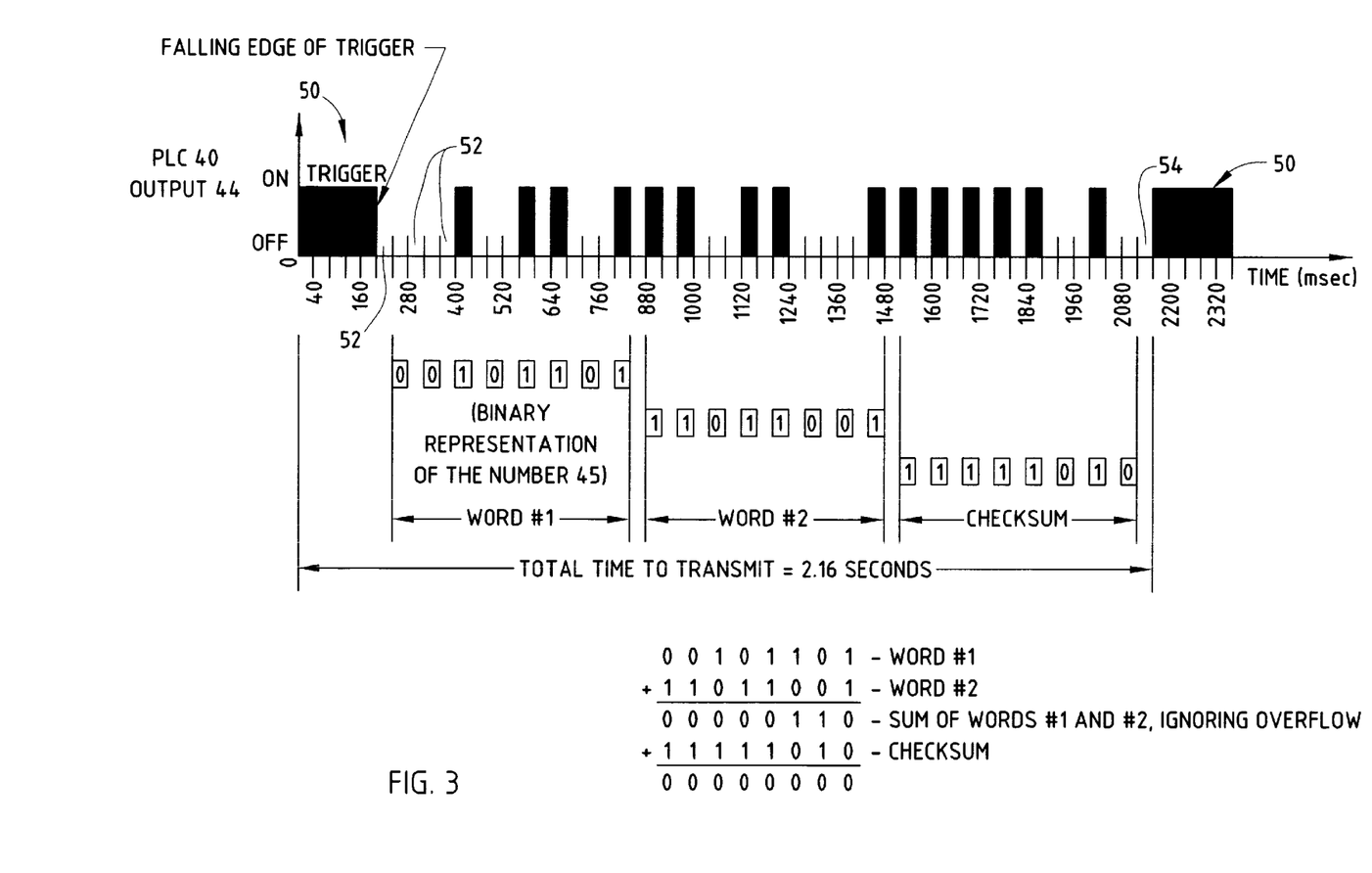
FIG. 3 is timing diagram of the communications protocol of one embodiment of the present invention.

One embodiment of a communications protocol for communications system 20 is depicted in FIG. 3. Off-board PLC 40 begins the communication of a message by first turning on (i.e. setting at a high level) its output 44 for a predetermined period of time equal, in this example, to 200 milliseconds. This 200 millisecond time period constitutes a trigger signal 50 that indicates the start of a message. In this embodiment, the communications protocol is divided into 40 millisecond time increments, and trigger 50 comprises a high signal for five consecutive such time slices. Trigger signal 50 may alternatively comprise a different number of time slices, and in fact can take any form so long as it will be recognized by PLC 42 as constituting the start of a message. After trigger signal 50 has been output, the content of the message is then output onto communications buss bar 35 as a series of binary bits made up of 1's and 0's, where each 1 corresponds to a high output voltage and each 0 corresponds to a low output voltage. In the preferred embodiment, each transmitted bit is separated by a spacer signal 52, which comprises a single time slice of 0 volts. While this is not necessary, it has been found that using a single spacer signal 52 between each transmitted bit helps prevent transmission errors. This spacing of bits also serves to distinguish trigger signal 50 from message content that might happen to contain five consecutive 1's.

In the protocol illustrated in FIG. 3, the message comprises three eight bit words, the first two of which are devoted to message content, and the last one of which is preferably used as a checksum signal. A large number of variations can be made to this protocol. For example, the checksum is entirely optional. Also, the order in which the words are transmitted can be varied. Further, the number of words, along with the number of bits comprising them, can, of course, be varied as would be understood by one skilled in the art. In the illustrated example, a first spacer signal 52 of zero volts is transmitted immediately after trigger signal 50 has been output. Specifically, the 0 volt spacer signal 52 is output between 200 and 240 milliseconds after the trigger signal is first transmitted. In the time slice between 240 and 280 milliseconds, the first bit of the message is output at PLC output 44. In the illustrated example, this first bit is a zero, and this bit is "transmitted" by keeping output 44 turned off. Following this first bit, another spacer signal 52 is transmitted in the time slice between 280 and 320 milliseconds. After this second spacer signal 52, the next bit of word #1 is transmitted in the time slice between 320 and 360 milliseconds. Another spacer signal follows this bit. When the first high (i.e., 1) bit of word #1 is finally reached, in this case between 400 and 440 milliseconds, output 44 is turned on for approximately 40 milliseconds. Another spacer signal follows this transmitted bit. The rest of the message is subsequently broadcast in like manner wherein each bit, which may be either a 1 or 0, is transmitted and is interleaved by spacer signals 52. No special signals are necessary to separate the individual words, other than the spacer signal between every bit, because on-board PLC 42 is programmed in advance to know how many bits comprise each of the individual words. After the message has been completely transmitted, it may be desirable to include a trailing spacer signal 54, such as the one illustrated in FIG. 3 which is broadcast during the 2120–2160 millisecond time slice. Trailing spacer signal 54 may be broadcast for different lengths of time other than the single time slice illustrated in FIG. 3. After trailing spacer signal 54 is broadcast, another trigger signal 50 is broadcast and either a new message or the same message is broadcast in like manner.

In the preferred embodiment, communications system 20 includes an error detection or error correction mechanism as part of the transmission protocol. While other mechanisms are possible, a checksum mechanism is included in the illustrated embodiment. This checksum is computed by adding words #1 and #2 together, ignoring any overflow, and taking the 2's complement of this sum. After on-board PLC 42 receives words #1 and #2 and the checksum, it adds together words #1, #2, and the checksum, ignoring any overflow. Because the checksum is the 2's complement of the sum of words #1 and #2, the total sum of words #1, #2, and the checksum should be 0. This is illustrated in FIG. 3. If the total sum of these three is not zero, PLC 42 assumes that an error has occurred in the transmission and ignores the transmitted message. Because PLC 40 is programmed to repeatedly broadcast the same message over and over until the need arises to change the message, PLC 42 does not need to communicate to PLC 40 that an error-containing transmission has occurred. Instead, PLC 42 simply ignores the erroneous message and waits until it is re-broadcast. Typically, the contents of a message are changed only when computer 48 tells PLC 40 to change the transmitted message. When such a new message is commanded, PLC 40 is programmed to repeatedly broadcast the new message over and over again until yet another new message is received. In this manner, on-board PLC 42 avoids having to send a message to off-board PLC 40 that it has received a transmission containing an error.

Figure 4:
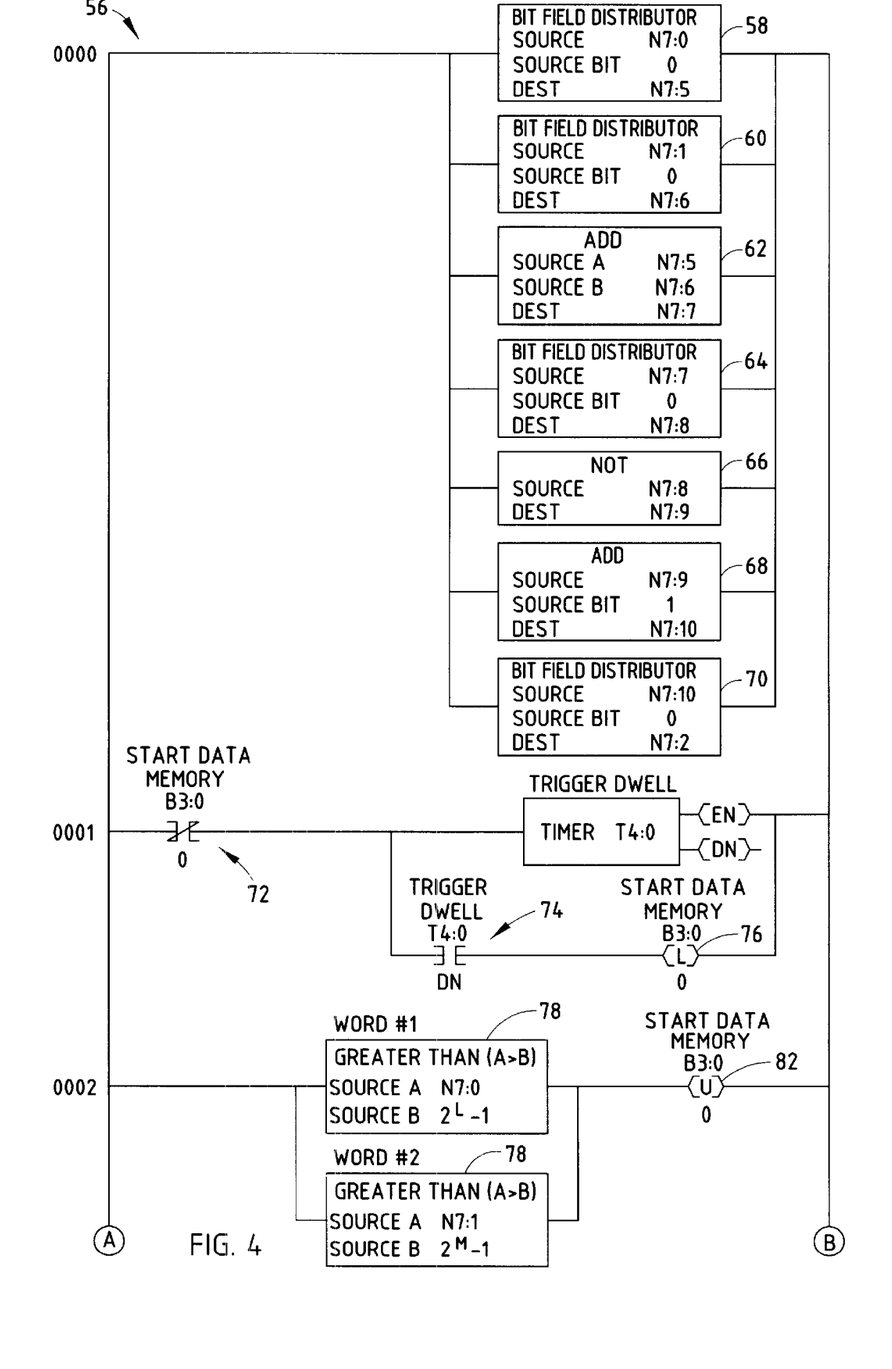
FIGS. 4, 4A, and 4B are ladder diagrams for the off-board programmable logic controller of one embodiment of the present invention.
Figure 4A:
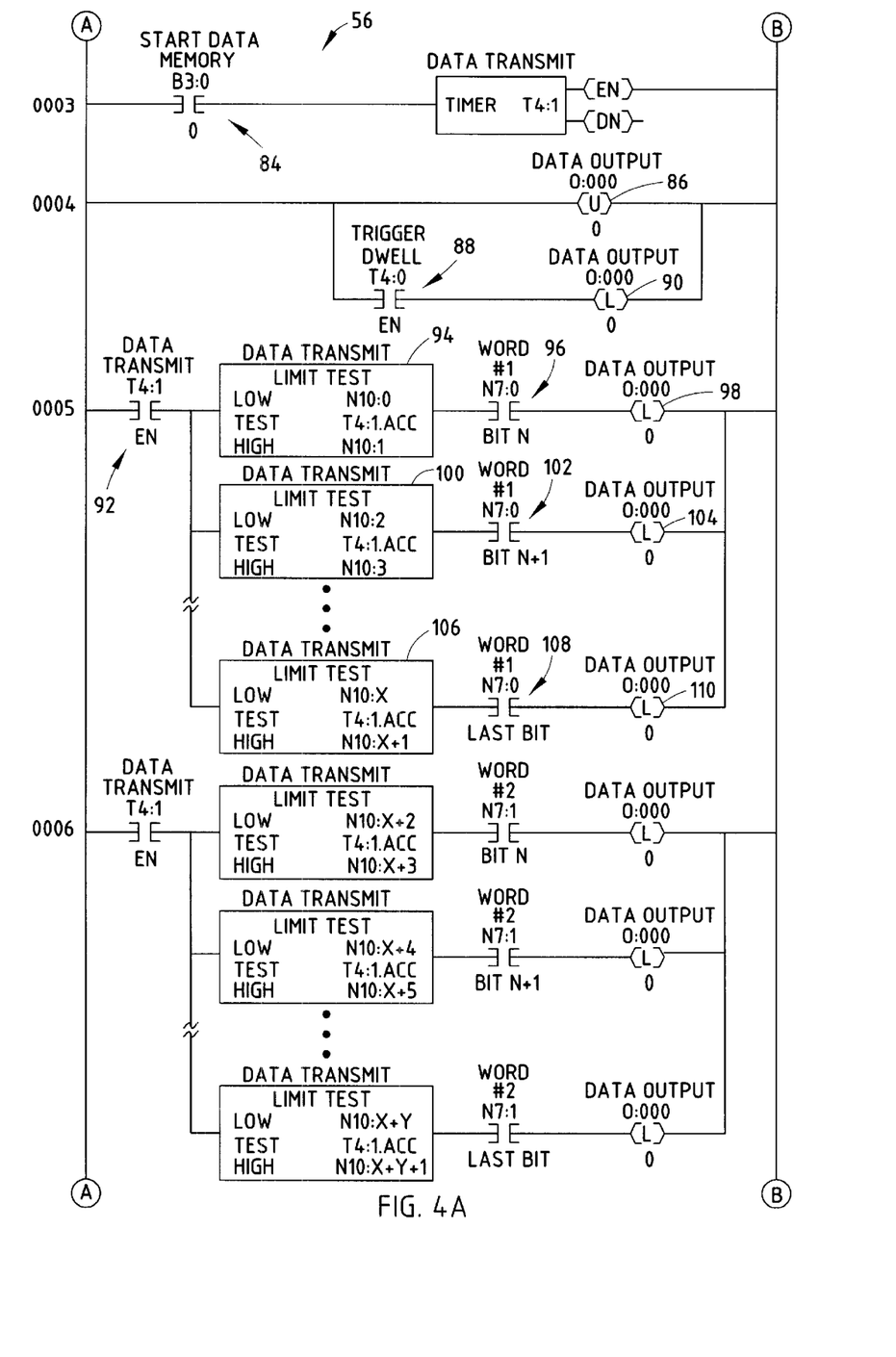
Figure 4B:
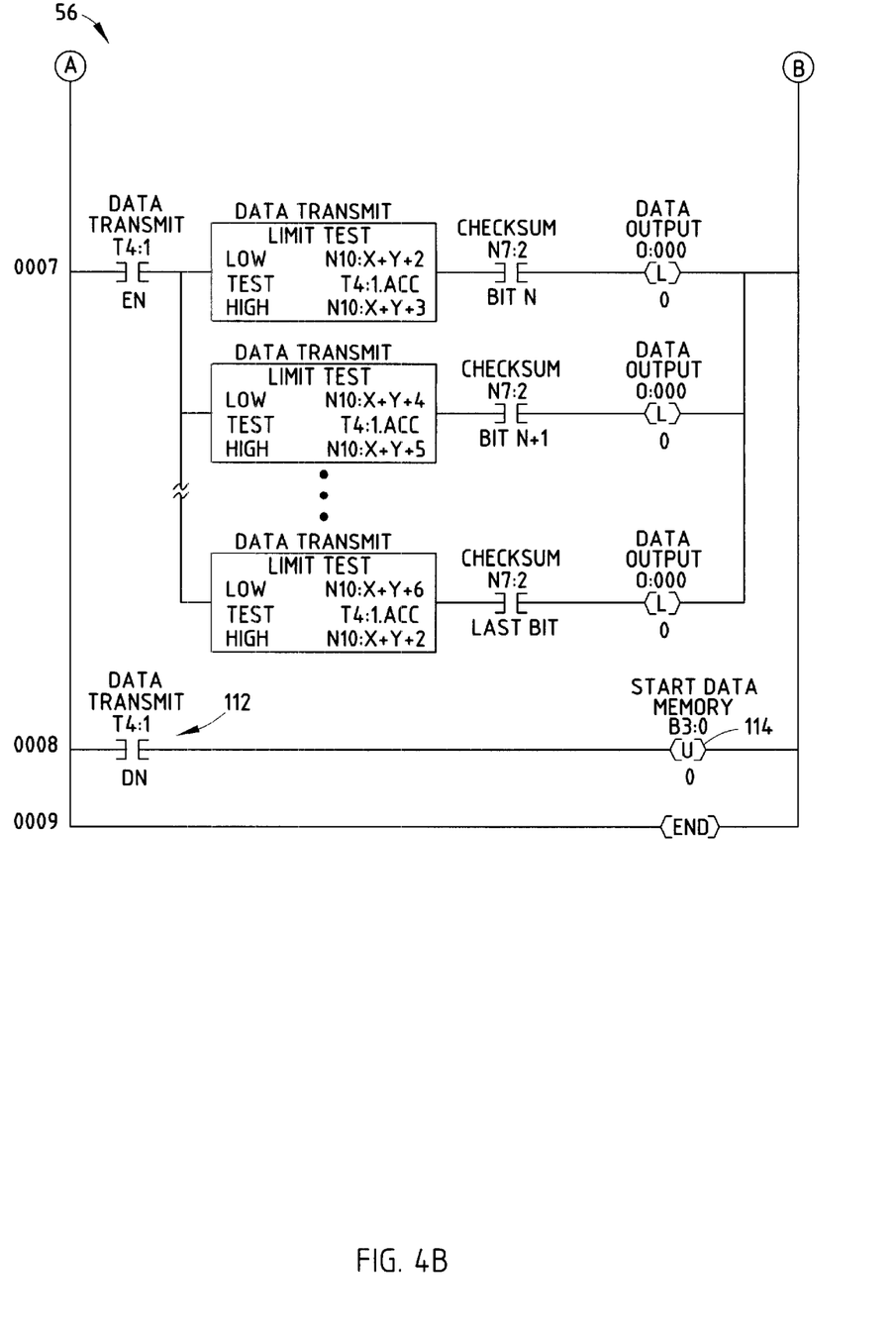

A ladder diagram 56 depicting the programming of off-board PLC 40 is depicted in FIGS. 4, 4A, and 4B. The illustrated diagram is based on Rockwell Software RSLogix 5, sold by Rockwell Automation of Milwaukee, Wisconsin, although it will be understood by those skilled in the art that any PLC programming software that is compatible with the selected PLC can be used within the scope of the invention. Ladder diagram 56 comprises ten rungs labeled 0000 through 0009. Rung 0000 serves to compute the checksum associated with words #1 and #2. The content of word #1 is stored in a memory location N7:0, while the content of word #2 is stored in memory location N7:1. Bit field distributors 58 and 60 serve to move the contents of words #1 and #2 into memory locations N7:5 and N7:6, respectively. ADD instruction 62 adds together the two words stored in memory locations N7:5 and N7:6 and place the sum in memory location N7:7. Bit field distributor 64 moves the sum in memory location N7:7 to memory location N7:8. NOT instruction 66 changes all of the 0's in memory location N7:8 to 1's, and all of the 1's in memory location N7:8 to 0's. The result is placed in memory location N7:9. ADD instruction 68 adds the number one to the sum stored in memory location N7:9 and stores the sum in memory location N7:10. This sum is the checksum that will be transmitted as part of the error correcting mechanism of communications system 20. Bit field distributor 70 moves this sum from memory location N7:10 to N7:2 prior to transmission.

Rung 0001 starts the timer for trigger signal 50. An Examine-If-On instruction 72 checks to see if Start Data Memory B3:0 is true, and if it is, Timer T4:0 begins counting. Timer T4:0 counts for a period of time equal to the trigger signal 50, which in the illustrated embodiment is 200 milliseconds. After 200 milliseconds have been counted, the "done" output (DN) of Timer T4:0 is set to a logic true condition. An Examine-If-On instruction 74 monitors Timer T4:0 and causes a latch 76 to set Start Data Memory B3:0 to a true condition when Timer T4:0 has completed its counting (i.e. the "done" output is set to true).

Rung 0002 performs an optional check to see if the words which are to be transmitted exceed the maximum number of bits that can be handled by the communications protocol. For example, in the protocol depicted in FIG. 3, words #1 and #2 are each eight bits long. The largest number that they can each represent is therefore the decimal value 255 ($2^8-1=255$). In general, the largest decimal value which a word can represent is $2^K-1$, where K is the number of bits in the word. Greater Than instruction 78 therefore checks to see if the value of word #1, which is stored in memory location N7:0, is greater than $2^L-1$, where L represents the number of bits in word #1. Greater Than instruction 80 checks to see if the value of word #2, which is stored in memory location N7:1, is greater than $2^M-1$, where M represents the number of bits of word #2. If the values of either word #1 or #2 exceed the maximum value which can be represented by the number of bits in each word, then an error has occurred and the word with the excessive value cannot be transmitted. In such a case, the binary value stored in Start Data Memory B3:0 is unlatched at 82, which prevents the message from being transmitted by PLC 40.

Rung 0003 (FIG. 4A) starts a data transmission timer that is used to set the output of PLC 40 to the appropriate value at the appropriate time in transmitting the desired message to PLC 42. An Examine-If-On instruction 84 causes Timer T4:1 to begin counting when Start Data Memory B3:0is in a true condition. As can be seen from rung 0001, Start Data Memory B3:0 will only be in a true condition when Timer T4:0 has finished the counting for trigger signal 50. Timer T4:1 will therefore not begin counting until after trigger signal 50 has been output. Timer T4:1 counts for at least as long as the total time between trigger signals 50. In the embodiment of FIG. 3, Timer T4:1would count for at least 1960 milliseconds (2160–200).

Rung 0004 partially controls that data that is output via Data Output O:000. Data Output O:000 is electrically coupled to communications buss bar 35 and is the output used to transmit the messages to on-board PLC 42. When Data Output O:000 is on, a 240 volt AC signal is output onto communications buss bar 35. A signal of different voltage, or a DC signal, could alternatively be used within the scope of the invention. An Unlatch instruction 86 initially sets Data Output O:000 to a false (i.e. no output) condition. Unlatch instruction 86 functions to insert spacer signal 52 between each transmitted bit of the message, as will become apparent upon review of the rest of ladder diagram 56. An Examine-If-On instruction 88 causes Data Output O:000 to latch (at 90) to a true condition whenever Timer T4:0 is still counting. As described above, Timer T4:0 counts the time during which trigger signal 50 is output. Latch instruction 90 therefore ensures that Data Output O:000 is set to a high output throughout the trigger signal 50 time period.

Rung 0005 transmits the data contained within word #1 (FIG. 4A). An Examine-If-On instruction 92 determines whether Timer T4:1 is enabled (i.e. counting) and only allows the data of word #1 to be transmitted if Timer T4:1 is enabled. If Timer T4:1 is enabled, a Limit Test instruction 94 determines whether the total accumulated count of Timer T4:1 is between the values specified in memory locations N10:0 and N10:1. The values specified in memory locations N10:0 and N10:1 are the beginning and ending times for the first transmitted bit of the message. In the example of FIG. 3, the first transmitted bit of word #1 is a 0 and it is transmitted between 240 and 280 millisecond after the trigger signal is first begun. Because Timer T4:1 does not begin counting until after the trigger signal 50 has been transmitted, the memory values N10:0 and N10:1 would be 40 and 80 for the example of FIG. 3. Limit Test instruction 94 would therefore determine whether the total accumulate count of Timer T4:1 was between 40 and 80 milliseconds. If so, an Examine-If-On instruction 96 would check to see if bit N of word #1 is true or not and cause Data Output O:000 to latch (at 98) to the same logic value as bit N. Bit N is the first transmitted bit of word #1 (i.e. the leftmost bit in the example of FIG. 3). Thus, Data Output O:000 will be latched high if bit N is a 1, or latched low if bit N is a 0. This causes bit N to be transmitted from Data Output O:000 along communications buss bar 35 to on-board PLC 42.

Rung 0005 further includes a second Limit Test instruction 100 that is used to transmit the second bit of word #1 (Bit N+1). Limit Test instruction 100 determines whether the total accumulated count of Timer T4:1 is between the values stored in memory locations N10:2 and N10:3. In the example of FIG. 3, the values 120 and 160 would be stored in N10:2 and N10:3, respectively, because these are the beginning and ending times during which the second bit of word #1 is transmitted (measured from the time trigger signal 50 has been completed). An Examine-If-On On instruction 102 and latch instruction 104 will set Data Output O:000 to the value of bit N+1 of word #1 if Timer T4:1 has a total accumulated count between 120 and 160. The second bit (from the left) of word #1 will therefore be transmitted 120 milliseconds after trigger signal 50 is sent, and will continue to be transmit for 40 milliseconds.

Rung 0005 includes as many Limit Test instruction as there are bits in word #1. Each limit test checks to see if the time has been reached for transmitting that particular bit by checking the total accumulated count of Timer T4:1. If it is the appropriate time for transmitting a particular bit, Data Output O:000 is set to the value of that bit for a forty millisecond time period. Limit Test instruction 106 will be the last limit test instruction in rung 0005, and is used to transmit the last bit of word #1. Limit Test instruction 106 will check to see if the total accumulated count of Timer T4:1 is between the values stored in memory locations N10:x and N10:x+1. The variable x is used because the total length of word #1 can be changed in different embodiments of the invention. In the example of FIG. 3, where word #1 is an eight bit word, Limit Test instruction 106 would determine if the total accumulated count of Timer T4:1 was between the values stored in memory locations N10:14 and N10:15, which would be 600 and 640, respectively. If so, Data Output O:000 would be set to the value of the last bit of word #1 by way of Examine-If-On instruction 108 and Latch instruction 110.

Rungs 0006 and 0007 transmit word #2 and the checksum word, respectively, in the same mainer that rung 0005 transmits word #1. Rungs 0006 and 0007 each include as many Limit Test instructions as there are bits in the respective word being transmitted. Each Limit Test instruction is used to monitor the total accumulated count of Timer T4:1 and cause the appropriate bit to be output onto Data Output O:000 at the appropriate time. Like with rung 0005, rungs 0006 and 0007 are depicted generically for allowing the transmission of words of an arbitrary number of bits. The last Limit Test in rung 0006 would check to see if the total accumulated count of Timer T4:1 was between the values stored in memory locations N10:x+y and N10:x+y+1. Likewise, the last Limit Test in rung 0007 would check to see if the total accumulated count of Timer T4:1 was between the values stored in memory locations N10:x+y+z and N10:x+y+z+1. The variables x, y, and z are used to denote the fact that the lengths of word #1 and the checksum word can be varied. In the example of FIG. 3, the memory locations N10:x+y, N10:x+y+1, N10:x+y+z, and N10:x+y+z+1 would correspond to memory locations N10:30, N10:31, N10:46, and N10:47, respectively, and would contain the values 1240, 1280, 1880, and 1920, respectively. It will be understood, of course, that the values contained in the memory locations N10:0–N10:x+y+z+1 are dependent upon the length of the time slices that are chosen for transmitting the bits of the message. In the illustrated example, this time slice length is 40 milliseconds. Other time slices can be used. If 20 millisecond time slices were used, the values stores in memory locations N10:0–N10:x+y+z+1 would all be cut in half. If 80 millisecond time slices were used, these values would be doubled. The chosen time slice should be several times longer than the program scan time of on-board PLC 42 to help ensure accurate reception. For example, a 40 millisecond time slice is suitable for use with an on-board PLC having a program time scan in the range of 5 to 10 milliseconds, although scan times outside this range can also be used.

In rung 0008 (FIG. 4B), an Examine-If-On instruction 112 causes Start Data Memory B3:0 to be unlatched (at 114) when Timer T4:1 has stopped counting (i.e. reached its done (DN) condition). The unlatching of Start Data Memory B3:0 causes the trigger timer to start again, as set forth in rung 0001. By setting the maximum count of Timer T4:1 at a count which is higher than the total accumulated time it takes to transmit the message, trailing spacer signal 54 is created. The length of trailing spacer signal 54 is controlled by how long Timer T4:1 is programmed to continue counting past the time necessary to transmit the message.

Figure 5:
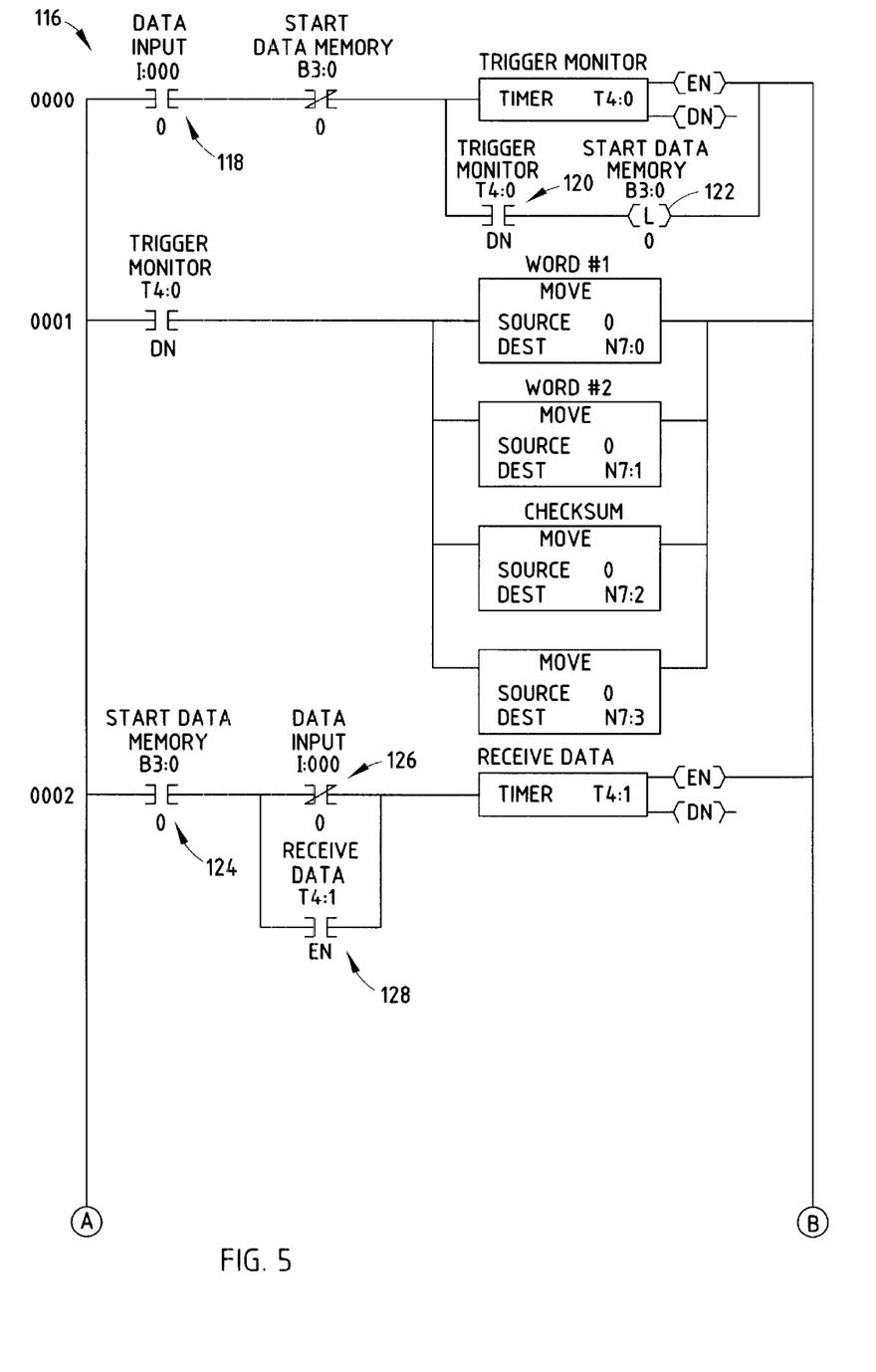
FIGS. 5, 5A, and 5B are ladder diagrams for the on-board programmable logic controller of one embodiment of the present invention.
Figure 5A:
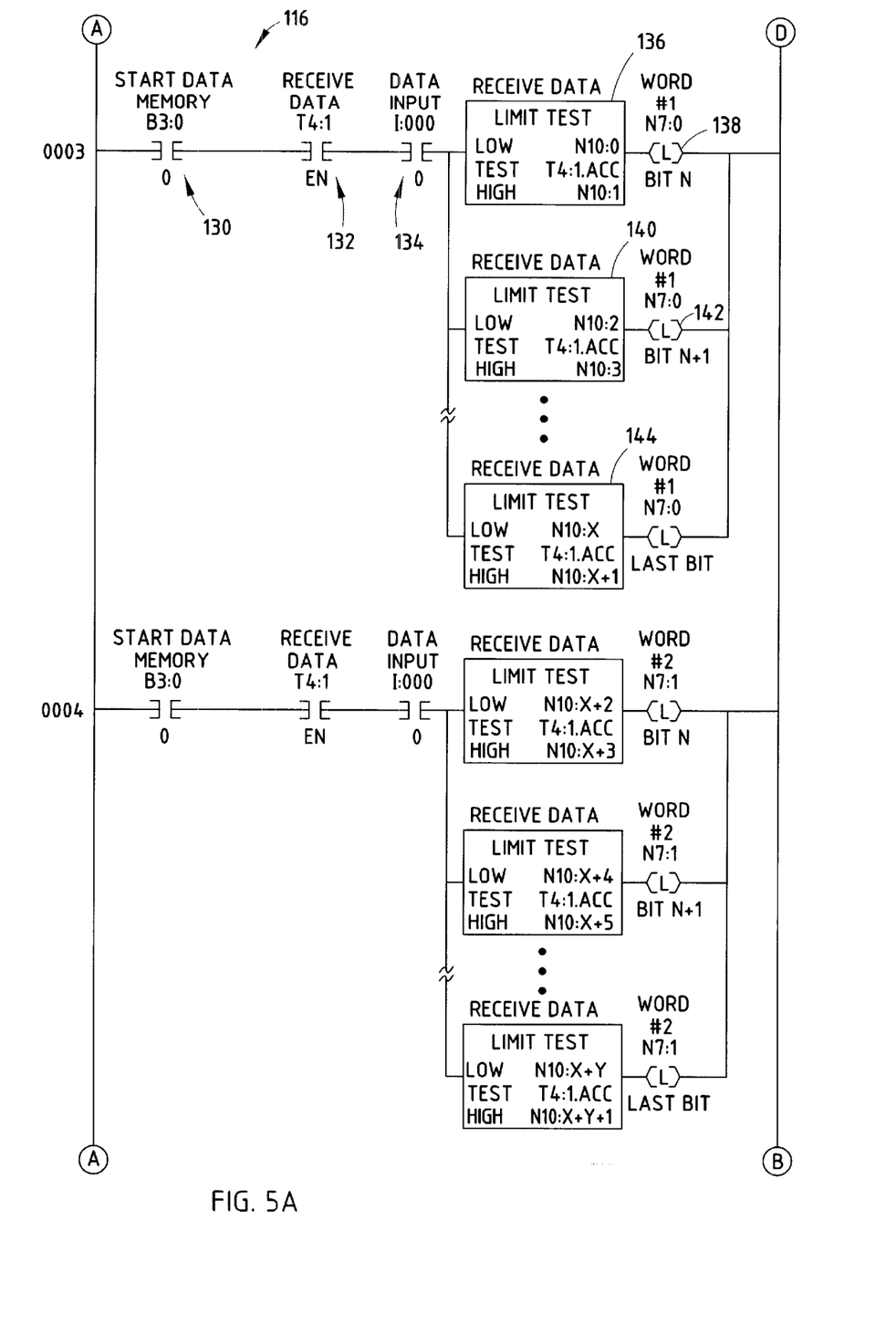
Figure 5B:
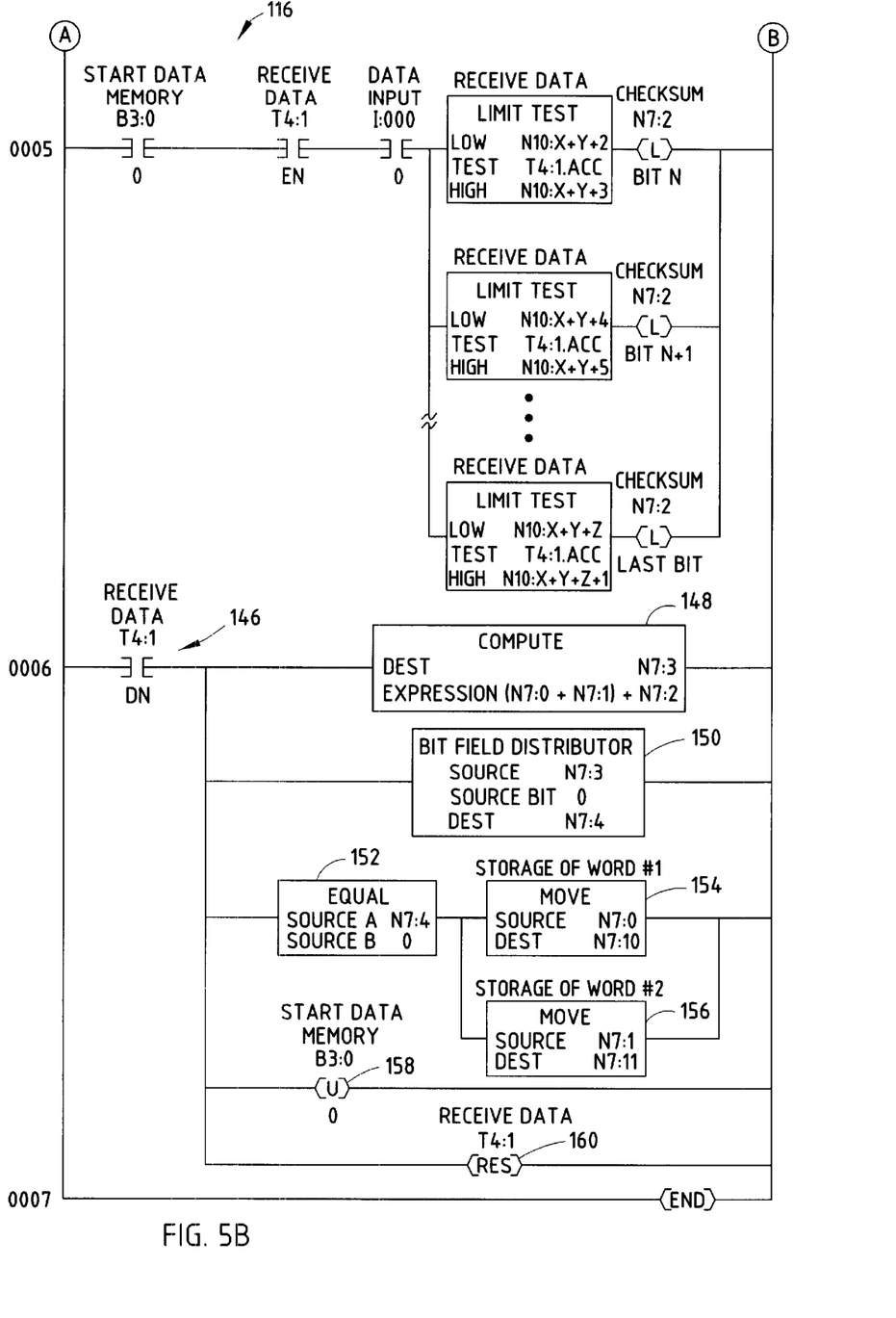

Ladder diagram 116 is depicted in FIGS. 5, 5A, and 5B and describes the programming for the on-board PLCs 42. Data Input 1:000 is electrically coupled to communications buss bar 35 and detects the series of high and low voltages that are output onto buss bar 35 from off-board PLC 40. In rung 0000, an Examine-If-On instruction 118 causes a Timer T4:0 on PLC 42 (not to be confused with Timer T4:0 on PLC 40) to begin counting. Timer T4:0 is used to monitor whether or not trigger signal 50 has been sent. In the embodiment of FIG. 3, the trigger signal is 200 milliseconds long. Timer T4:0 is preferably set to a time period slightly shorter than the full 200 millisecond period. If a 200 millisecond trigger is used, Timer T4:0 might be set to 160 milliseconds. When Timer T4:0 has finished counting, an Examine-If-On instruction 120 causes Start Data Memory B3:0 to be latched on (at 122).

Rung 0001 functions to clear out (i.e. set to 0) any data that was previously stored in memory locations N7:0, N7:1, N7:2, and N7:3. Memory locations N7:0, N7:1, and N7:2 are used to store words #1, #2, and the checksum word, respectively. Rung 0001 thus clears out any old values that might be in these memory locations from previous transmissions. Memory locations N7:3 is used for temporary storage, as discussed below.

Rung 0002 starts a Timer T4:1 after trigger signal 50 has been detected. Timer T4:1 is used to determine what bit is being transmitted by off-board PLC 40 at any particular time. An Examine-If-On instruction 124 examines if Start Data Memory B3:0 is true or not. Start Data Memory B3:0 will only be true, per rung 0000, after the trigger signal has been detected for substantially the entire period of the trigger signal (e.g. 160 of the total 200 milliseconds). When Start Data Memory B3:0 is true, an Examine-If-Off instruction 126 will cause Timer T4:1to start counting only when Data Input I:000 goes to a low condition. Data Input I:000 will go to a low condition as soon as the trigger signal 50 has been transmitted. Timer Data T4:1 will therefore start immediately after trigger signal 50 has been sent. An Examine-If-On instruction 128 ensures that Timer T4:1 will continue to count after it has started up until the limit of Timer T4:1 has been reached. The limit of Timer T4:1 should be set to a time period long enough to receive the entire message. In the current embodiment, the limit of Timer T4:1 is set to the same limit as that of Timer T4:1 located on off-board PLC 40.

Rung 0003 (FIG. 5A) detects and stores word #1 transmitted from off-board PLC 40. A pair of Examine-If-On instructions 130 and 132 ensure that rung 0003 only functions to receive data when Start Data Memory is true (i.e. trigger signal 50 has been received) and when Timer T4:1 is still counting, respectively. Rung 0003 includes one or more Limit Tests, the total number corresponding to the number of bits in word #1. Due to an Examine-If-On instruction 134, the Limit Tests are only performed if a high signal is detected on Data Input I000. If no high signal is detected for a given time period, the corresponding bit or bits in memory locations N7:0, N7:1, and N7:2 are not changed and remain zero due, as set in rung 0001. When a high signal is detected at Data Input I000, the Limit Tests of rung 0003 are performed. A first Limit Test 136 checks to see if the total accumulated count of Timer T4:1 is between the values stored in memory locations N10:0 and N10:1. These two memory locations store the beginning and ending times for the first time slice in which a bit is transmitted. Thus, in the example of FIG. 3, these two memory locations would store the values 40 and 80, respectively. (The first 40 millisecond time period would be occupied by spacer signal 52). If the total accumulated count of Timer T4:1 is between 40 and 80, then a Latch 138 latches the first bit (bit N) of word #1 (stored in memory location N7:0) to a high value. A second Limit Test 140 determines whether the total accumulated count of Timer T4:1 is between the values stored in memory locations N10:2 and N10:3. These values correspond to the beginning and ending times for the particular time slice in which the second bit of word #1 is transmitted. If the total accumulated count of Timer T4:1 is between these two values, a latch instruction 142 latches the second bit of word #1 to a high value. In the embodiment of FIG. 3, the values of N10:2 and N10:3 would be 120 and 160, although, as noted, other values could be used if different sized time slices were used in the communications protocol. The last bit of word #1 will be detected by Limit Test 144. In the embodiment of FIG. 3, Limit Test 144 will be the eighth limit test on rung 0003 because word #1 is eight bits long.

Rungs 0004 and 0005 detect word #2 and the checksum word, respectively, in the same manner as rung 0003 detects word #1. Each rung includes as many limit tests as there are bits for that particular word. Each limit test monitors Timer T4:1 to see if the time has arrived for the receipt of that particular bit. Because the memory locations for storing words #1, #2, and the checksum are initially set to zero, each limit test is only activated when a high signal is detected on Data Input I000.

Rung 0006 (FIG. 5B) utilizes the transmitted checksum to determine if there was an error in transmission. An Examine-If-On instruction 146 allows the checksum calculations to begin only when Timer T4:1 has stopped counting. The checksum calculations are therefore not performed until the entire message has been received. A Compute instruction 148 calculates the sum of words #1 and 2 and the checksum, which are stored in memory locations N7:0, N7:1, and N7:2, respectively, and places the calculated sum into memory location N7:3. A bit field distributor 150 moves the sum into memory location N7:4 and thereby strips off any overflow in the calculated sum. An Equal instruction 152 determines whether the sum (ignoring the overflow) is equal to zero or not. If it is zero, the received data is presumed valid, and Move instructions 154 and 156 move the received words #1 and #2 (stored in N7:0 and N7:1) into memory locations N7:10 and N7:11, where they may be used by PLC 42 to control other operations on the electrified monorail vehicle 24. If the sum (ignoring the overflow) does not equal zero, the data is presume to contain an error and words #1 and #2 are not moved into their final memory locations N7:10 and N7:11. Unlatch instruction 158 latches the Start Data Memory B3:0 to a false condition and Reset instruction 160 resets Timer T4:1, thereby allowing another message to be detected after another trigger signal is detected.

The off-board program depicted in the ladder diagram of FIGS. 4, 4A, and 4B is used for sending data from off-board PLC 40 to a single communications buss bar 35, or a single segment of the communications buss bar. If a segmented communications buss bar 35 is used, and it is desired to send messages to different segments, the off-board program is repeated using a different output on PLC 40 that is electrically coupled to the particular segment of communications buss bar 35. For example, the off-board program depicted in FIGS. 4, 4A, and 4B is designed to output signals on output O:000. In FIG. 3, this program would therefore only be able to communicate messages to the segment of buss bar 35 that is in front of station #10. If it were desired to communicate with the segments in front of all eight of the work stations, the off-board program would be repeated 7 additional times for a total of eight copies. The difference between the programs would be the particular output controlled by the program, although it would also be possible to make other variations to each copy, if desired, such as to word length, number of words, etc.

The programs of FIGS. 4, 4A, 4B, 5, 5A, and 5B are designed only for one way communication from off-board PLC 40 to on-board PLC(s) 42. It would, however, be possible to change the communications protocol to accommodate two-way communications if desired. This could be accomplished, for example, by allowing on-board PLC 42 to transmit messages back to PLC 40 after every other trigger signal sent from off-board PLC 40, to thereby have each PLC alternatingly transmit messages to each other. This would allow information to be fed from the carrier, or its load, back to the off-board PLC. A wide variety of other methods could also be used to provide for two-way communication.

While the present invention has been described in terms of the preferred embodiments depicted in the drawings and discussed in the above specification, along with several alternative embodiments, it will be understood by one skilled in the art that the present invention is not limited to these particular embodiments, but includes any and all such modifications that are within the spirit and the scope of the present invention as defined in the appended claims.

What is claimed is:

1. A communications system for an electrified monorail system having an electrified monorail including at least one electrically conductive buss bar and a vehicle, said communication system comprising;

a first programmable logic controller having an output configured be electrically coupled to at least one electrically conductive buss bar, said output assuming more than one state, said first programmable logic controller being programmed to sequentially set said output at a series of states corresponding to a message; and a second programmable logic controller configured to be carried by the vehicle having an input configured to be electrically coupled to said at least one electrically conductive buss bar, said second programmable logic controller being programmed to store in memory said series of states output from said first programmable logic controller through the at least one electrically conductive buss bar.

2. The communications system of claim 1 wherein said more than one state of said output comprises high and low voltages.

3. The communications system of claim 2 wherein said first programmable logic controller is programmed to output a constant voltage for a predetermined time period between each high and low voltage corresponding to said message.

4. The communications system of claim 2 wherein said first programmable logic controller is programmed to output a trigger signal prior to outputting said series of high and low voltages.

5. The communication system of claim 2 wherein said high voltages are AC voltages and said low voltages are substantially zero volts.

6. The communications system of claim 2 wherein said high voltages are DC voltages and said low voltages are substantially zero volts.

7. The communications system of claim 1 wherein said first programmable logic controller is in communication with a computer, said computer adapted to control the content of said message.

8. The communications system of claim 1 wherein said at least one buss bar is divided into electrically isolated sections, and said first programmable logic controller is electrically coupled to only one of said electrically isolated sections.

9. The communications system of claim 8 wherein said constant voltage is a low voltage.

10. The communications system of claim 9 wherein said first programmable logic controller is programmed to repeatedly output said trigger signal and said series of high and low voltages corresponding to said message.

11. A communications system for an electrified monorail system having an electrified monorail including at least one electrically conductive buss bar and a vehicle, said communication system comprising:

a first programmable logic controller having a first output, configured to be electrically coupled to at least one electrically conductive buss bar, said first output assuming more than one state, said first programmable logic controller being programmed to sequentially set said first output at a series of states corresponding to a message, said first programmable logic controller also having a second output adapted to be electrically coupled to a second electrically conductive buss bar, said first programmable logic controller being programmed to sequentially set said second output at a series of high and low voltages corresponding to a second message; and a second programmable logic controller configured to be carried by the vehicle having an input configured to be electrically coupled to said at least one electrically conductive buss bar, said second programmable logic controller being programmed to store in memory said series of states output from said first programmable logic controller through the at least one electrically conductive buss bar.

12. An electrified monorail system comprising:

an electrified monorail including at least one buss bar;

at least one carrier adapted to move on the electrified monorail;

a first programmable logic controller having an output electrically coupled to said at least one buss bar, said output capable of assuming more than one state, said first programmable logic controller being programmed to output onto said at least one buss bar a series of states corresponding to a message; and a second programmable logic controller having an input at least occasionally electrically coupled to said at least one buss bar, said second programmable logic controller being carried by said at least one carrier, said second programmable logic controller being programmed to store in memory said series of states output from said first programmable logic controller through said at least one buss bar.

13. The system of claim 12 wherein said first programmable logic controller is in communication with a computer, said computer adapted to control the content of said message.

14. The system of claim 12 wherein said at least one buss bar is divided into electrically isolated sections, and said first programmable logic controller is electrically coupled to only one of said electrically isolated sections.

15. The system of claim 12 further including a second carrier adapted to move along the electrified monorail and a third programmable logic controller located on said second carrier, said third programmable logic controller being programmed to store said series of states output from said first programmable logic controller in memory.

16. The system of claim 12 wherein said second programmable logic controller carries out actions on said carrier based upon the message received from said first programmable logic controller.

17. The system of claim 12 wherein said electrified monorail is an overhead electrified monorail, said carrier is capable of adjusting the height and rotation of a load being carried on said carrier, and said second programmable logic controller is programmed to adjust the height and rotation of the load on said carrier.

18. The system of claim 12 wherein said more than one state comprises high and low voltages.

19. The system of claim 18 wherein said high voltages are AC voltages and said low voltages are substantially zero volts.

20. The system of claim 12 wherein said electrified monorail is an overhead electrified monorail and said carrier depends downwardly from said monorail.

21. A method for transmitting information over a buss bar in an electrified monorail system having an electrified monorail including at least one buss bar and at least one carrier adapted to move on the electrified monorail, said method comprising:

providing a first programmable logic controller having at least one output;

providing a second programmable logic controller having at least one input;

coupling the output of said first programmable logic controller to the at least one buss bar;

at least occasionally coupling the input of said second programmable logic controller to said buss bar;

programming said first programmable logic controller to output a series of states corresponding to said information onto said buss bar; and programming said second programmable logic controller to detect said series of states on said buss bar and at least temporarily store said series of states in a memory in said second programmable logic controller.

22. The method of claim 21 further including programming said first programmable logic controller to output a trigger signal prior to outputting said series of states.

23. The method of claim 21 further including programming said first programmable logic controller to be able to change said information based on instructions received from a computer.

24. The method of claim 21 wherein said series of states comprises a series of high and low voltages.

25. The method of claim 24 further including programming said first programmable logic controller to output a constant voltage for a predetermined time period between each high and low voltage that are output corresponding to said information.

26. The method of claim 25 wherein said constant voltage is a low voltage.

27. The method of claim 24 further including programming said first programmable logic controller to output each of said high and low voltages for a fixed time period substantially equal to a scan time of said first programmable logic controller.

28. The method of claim 24 further including providing a carrier that moves along said buss bar and mounting said second programmable logic controller on said carrier.

29. The method of claim 28 further including programming said second programmable logic controller to control an operation on said carrier based upon said message.

30. The method of claim 24 wherein said high voltages are AC voltages and said low voltages are substantially zero volts.

31. A method for transmitting information over a buss bar in an electrified monorail system having an electrified monorail including at least one buss bar and at least one carrier configured on the electrified monorail, said method comprising:

providing a first programmable logic controller having at least one output;

providing a second programmable logic controller having at least one input;

coupling the output of said first programmable logic controller to the at least one buss bar;

at least occasionally coupling the input of said second programmable logic controller to said buss bar;

programming said first programmable logic controller to output a first series of voltages corresponding to said information onto said buss bar;

programming said first programmable logic controller to output a second series of high and low voltages that correspond to an error detection message;

programming said second programmable logic controller to detect said first series of voltages on said buss bar and at least temporarily store said first series of voltages in a memory in said second programmable logic controller; and programming said second programmable logic controller to determine, based upon said error detection message, whether or not said second programmable logic controller detected said first series of high and low voltages with any errors.

32. A method for transmitting information over a buss bar in an electrified monorail system having an electrified monorail including at least one buss bar and at least one carrier configured move on the electrified monorail, said method comprising:

providing a first programmable logic controller having at least one output;

providing a second programmable logic controller having at least one input;

coupling the output of said first programmable logic controller to the at least one buss bar;

at least occasionally coupling the input of said second programmable logic controller to said buss bar;

programming said first programmable logic controller to output a series of voltages corresponding to said information onto said buss bar;

programming said second programmable logic controller to detect said series of voltages on said buss bar and at least temporarily store said series of voltages in a memory in said second programmable logic controller;

providing a second output on said first programmable logic controller;

coupling said second output to a second buss bar; and programming said first programmable logic controller to output a series of high and low voltages corresponding to a second piece of information onto said second buss bar.

33. The method of claim 32 further including programming said first programmable logic controller such that said second piece of information output onto said second buss bar may be different from said information output onto said buss bar.

* * * * *

UNITED STATES PATENT AND TRADEMARK OFFICE
CERTIFICATE OF CORRECTION

PATENT NO.    : 6,463,367 B2  
DATED         : October 8, 2002  
INVENTOR(S)   : Robert F. Neff

It is certified that error appears in the above-identified patent and that said Letters Patent is hereby corrected as shown below:

Column 9,
Line 33, "mainer" should be -- manner --.

Column 13,
Line 25, delete "," after "output".

Signed and Sealed this

Twenty-ninth Day of July, 2003

JAMES E. ROGAN
*Director of the United States Patent and Trademark Office*